(12) United States Patent
Ogawa

(10) Patent No.: US 10,195,706 B2
(45) Date of Patent: Feb. 5, 2019

(54) OBJECT FASTENING DEVICE FOR FASTENING OBJECT TO RECEIVING PART, MACHINE TOOL, ROBOT, AND METHOD OF FASTENING OBJECT TO RECEIVING PART

(71) Applicant: FANUC CORPORATION, Minamitsuru-gun, Yamanashi (JP)

(72) Inventor: Kenichi Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/550,273

(22) Filed: Nov. 21, 2014

(65) Prior Publication Data
US 2015/0145193 A1 May 28, 2015

(30) Foreign Application Priority Data
Nov. 28, 2013 (JP) .................................. 2013-246626

(51) Int. Cl.
*B23Q 17/00* (2006.01)
*B23Q 3/08* (2006.01)
*B25J 15/02* (2006.01)

(52) U.S. Cl.
CPC ........... *B23Q 17/005* (2013.01); *B23Q 3/082* (2013.01); *Y10S 901/36* (2013.01); *Y10T 29/49998* (2015.01)

(58) Field of Classification Search
CPC ...... B23Q 15/14; B23Q 17/005; B23Q 3/082; B23Q 5/12; B23Q 5/36; Y10S 901/36; Y10T 29/49998

USPC ................... 269/24, 27, 32, 20, 228
See application file for complete search history.

(56) References Cited

U.S. PATENT DOCUMENTS

| | | | | |
|---|---|---|---|---|
| 2,520,249 A * | 8/1950 | LaPointe | ............... | B23Q 3/062 |
| | | | | 269/48.1 |
| 3,076,644 A * | 2/1963 | Friedland | ............... | B21D 43/10 |
| | | | | 269/152 |
| 3,758,099 A * | 9/1973 | Scott | ..................... | B21D 28/04 |
| | | | | 269/234 |
| 4,356,615 A * | 11/1982 | Dearman | ........... | B23K 37/0533 |
| | | | | 228/49.3 |
| 4,445,677 A * | 5/1984 | Hansen | .................. | B29C 66/81 |
| | | | | 100/283 |

(Continued)

FOREIGN PATENT DOCUMENTS

| JP | 07198370 | | 8/1995 | | |
|---|---|---|---|---|---|
| JP | H07198370 A | * | 8/1995 | ............ | B23Q 15/14 |

(Continued)

*Primary Examiner* — Joseph J Hail
*Assistant Examiner* — Arman Milanian
(74) *Attorney, Agent, or Firm* — RatnerPrestia

(57) ABSTRACT

An object fastening device which can prevent foreign matter from ending up damaging an object when confirming the object is properly seated, which object fastening device is provided with a receiving part, a pushing part which pushes the object against the receiving part, a first drive part which makes the pushing part generate a first force, a second drive part which is provided separate from the first drive part and makes the pushing part generate a second force which is smaller than the first force, and a foreign matter detecting part which detects foreign matter which is interposed between the object and receiving part while the second drive part is being used to cause the pushing part to push the object against the receiving part.

3 Claims, 6 Drawing Sheets

(56) References Cited

U.S. PATENT DOCUMENTS

| | | | | |
|---|---|---|---|---|
| 4,639,994 A * | 2/1987 | Cooper, Jr. | ............... | B23P 6/00 269/24 |
| 4,770,401 A * | 9/1988 | Donaldson | ............... | B25B 1/18 269/225 |
| 5,657,972 A * | 8/1997 | Blatt | ............... | B25B 5/065 269/22 |
| 5,876,025 A * | 3/1999 | Yonezawa | ............... | B25B 5/06 269/24 |
| 5,927,700 A * | 7/1999 | Yonezawa | ............... | B25B 5/062 269/24 |
| 6,113,086 A * | 9/2000 | Yonezawa | ............... | B25B 5/06 269/24 |
| 6,178,860 B1 * | 1/2001 | Peters | ............... | B23D 35/008 83/461 |
| 6,340,154 B1 * | 1/2002 | Young | ............... | B25B 5/06 254/215 |
| 6,585,246 B2 * | 7/2003 | McCormick | ............... | B25B 5/16 269/228 |
| 6,629,354 B1 * | 10/2003 | Kline | ............... | B62D 65/02 269/71 |
| 6,629,355 B2 * | 10/2003 | Murata | ............... | B25B 5/061 269/289 R |
| 6,925,916 B2 * | 8/2005 | Duggins | ............... | B21D 28/002 83/13 |
| 6,932,333 B2 * | 8/2005 | Bode | ............... | B25B 5/062 269/24 |
| 8,523,155 B2 * | 9/2013 | Kuroda | ............... | F16L 39/04 137/614 |
| 9,114,484 B2 * | 8/2015 | Harbaugh | ............... | B23K 37/0408 |
| 2003/0051328 A1 * | 3/2003 | Song | ............... | B62D 65/06 29/428 |
| 2004/0227508 A1 * | 11/2004 | Shafiyan-Rad | ............... | B23Q 17/005 324/207.22 |
| 2006/0213048 A1 * | 9/2006 | Kalanovic | ............... | A44C 27/00 29/468 |
| 2016/0151869 A1 * | 6/2016 | Dohi | ............... | B23Q 3/082 269/32 |

FOREIGN PATENT DOCUMENTS

| | | | |
|---|---|---|---|
| JP | 09-201742 | 8/1997 | |
| JP | 2003117777 | 4/2003 | |
| JP | 2005324277 | 11/2005 | |
| JP | 2007054844 | 3/2007 | |
| JP | 2008221350 | 9/2008 | |
| JP | 2008221350 A * | 9/2008 | ............... B23Q 3/06 |

\* cited by examiner

FIG. 3A
FIG. 3B
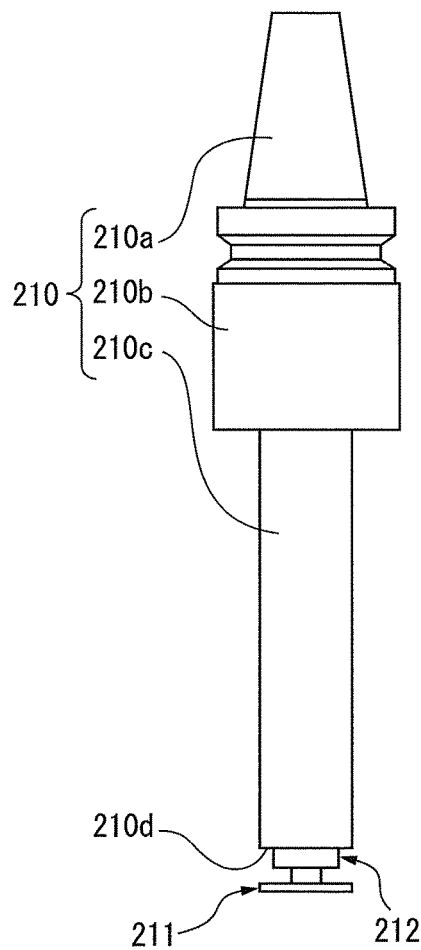
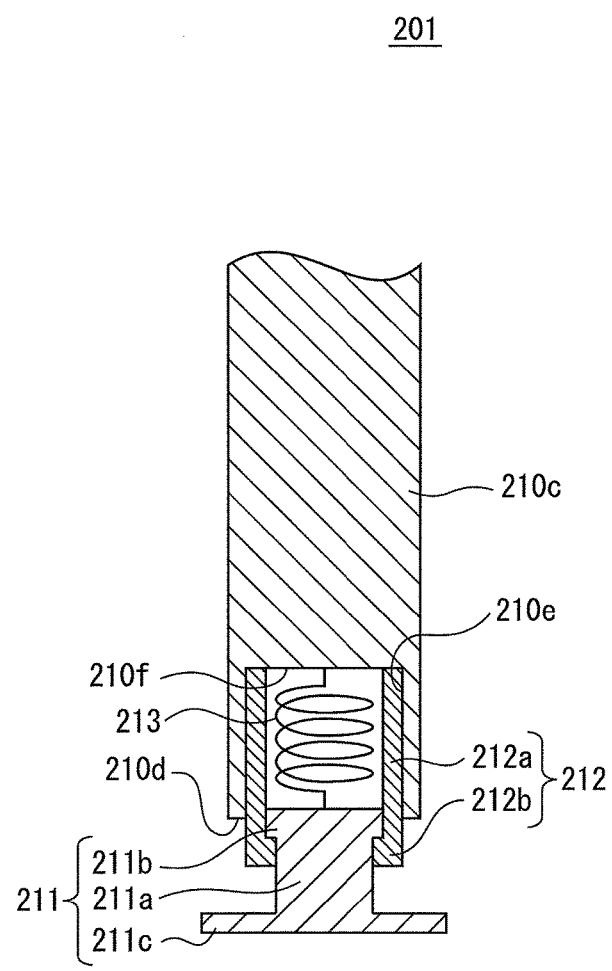

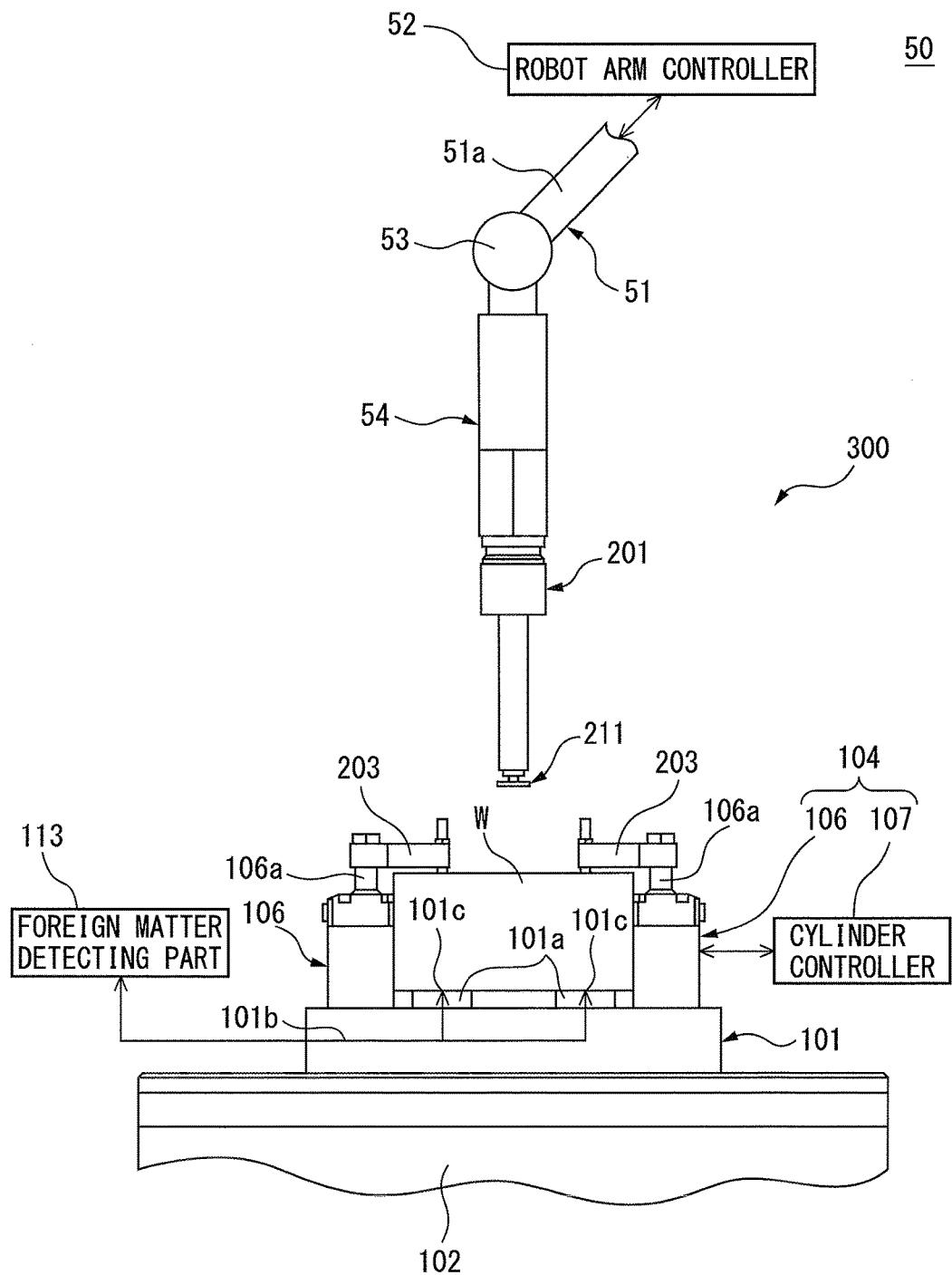

OBJECT FASTENING DEVICE FOR FASTENING OBJECT TO RECEIVING PART, MACHINE TOOL, ROBOT, AND METHOD OF FASTENING OBJECT TO RECEIVING PART

BACKGROUND OF THE INVENTION

1. Field of the Invention

The present invention relates to an object fastening device for fastening an object to a receiving part, a machine tool, a robot, and a method of fastening an object to a receiving part.

2. Description of the Related Art

In a system which uses a hydraulic cylinder to clamp a workpiece or other object with a receiving member and machines or otherwise performs work on that object, it is known to change the force by which the hydraulic cylinder clamps the object between a step of confirming whether the object suitably sits on the receiving member and the step of performing work on the object (for example, see Japanese Patent Publication No. 9-201742A).

According to the conventional system, since it was not possible to finely adjust the force which was applied by the hydraulic cylinder on the object, the object might be damaged when foreign matter entered between the object and receiving member upon clamping the object to the receiving member.

SUMMARY OF THE INVENTION

In one aspect of the present invention, an object fastening device includes a receiving part; a pushing part which pushes an object against the receiving part; a first drive part which generates a first force for fastening the object to the receiving part at the pushing part; a second drive part which is separate from the first drive part, and which generates a second force smaller than the first force at the pushing part; and a foreign matter detecting part which detects a foreign matter interposed between the object and the receiving part, while the pushing part pushes the object against the receiving part by the second force generated by the second drive part.

The second drive part may include a servo motor which generates the second force. The object fastening device may further include a first pushing part which pushes the object against the receiving part by the first force so as to fasten the object; and a second pushing part which is separate from the first pushing part, and which pushes the object against the receiving part by the second force. In this case, the first drive part may generate the first force at the first pushing part, and the second drive part may generate the second force at the second pushing part.

The second drive part may include a spring which generates the second force; and a movement mechanism movable in a direction approaching and moving away from the receiving part. In this case, the second pushing part may be connected to the movement mechanism via the spring. The second drive part may include a servo motor which generates the second force; and a movement mechanism movable in a direction approaching and moving away from the receiving part by the servo motor. In this case, the second pushing part may be connected to the movement mechanism.

In another aspect of the present invention, a machine tool includes a tool spindle and the above object fastening device. The second pushing part is attached to the tool spindle, and the second drive part drives the tool spindle so as to move the second pushing part in a direction approaching and moving away from the receiving part.

In still another aspect of the present invention, a robot includes a robot arm and the above object fastening device. The second pushing part is provided at the robot arm, and the second drive part drives the robot arm to move the second pushing part in a direction approaching and moving away from the receiving part. The robot may further include a robot hand which is attached to the robot arm and which releasably grips the second pushing part.

In still another aspect of the present invention, the method of fastening the object to the receiving part by means of the above object fastening device, comprises placing the object on the receiving part; driving the pushing part by the second drive part and pushing the object against the receiving part by the second force; detecting whether the foreign matter is interposed between the object and the receiving part by means of the foreign matter detecting part, during pushing the object against the receiving part by the second force. Further, the method comprises releasing the second force and removing the foreign matter when the foreign matter is detected at the step of detecting whether the foreign matter is interposed; and driving the pushing part by the first drive part and pushing the object against the receiving part by the first force so as to fasten the object, when the foreign matter is not detected at the step of detecting whether the foreign matter is interposed, or when the step of removing the foreign matter is completed.

BRIEF DESCRIPTION OF THE DRAWINGS

The above and other objects, features, and advantages of the present invention will become further clearer by the following description of the preferred embodiments given while referring to the attached drawings, in which:

FIG. 3A is a side view of a pushing tool shown in FIG. 2;

FIG. 3B is a side cross-sectional view of the pushing tool shown in FIG. 3A;

FIG. 5 is a block diagram which schematically shows a robot according to an embodiment of the present invention.

DETAILED DESCRIPTION

Figure 1:
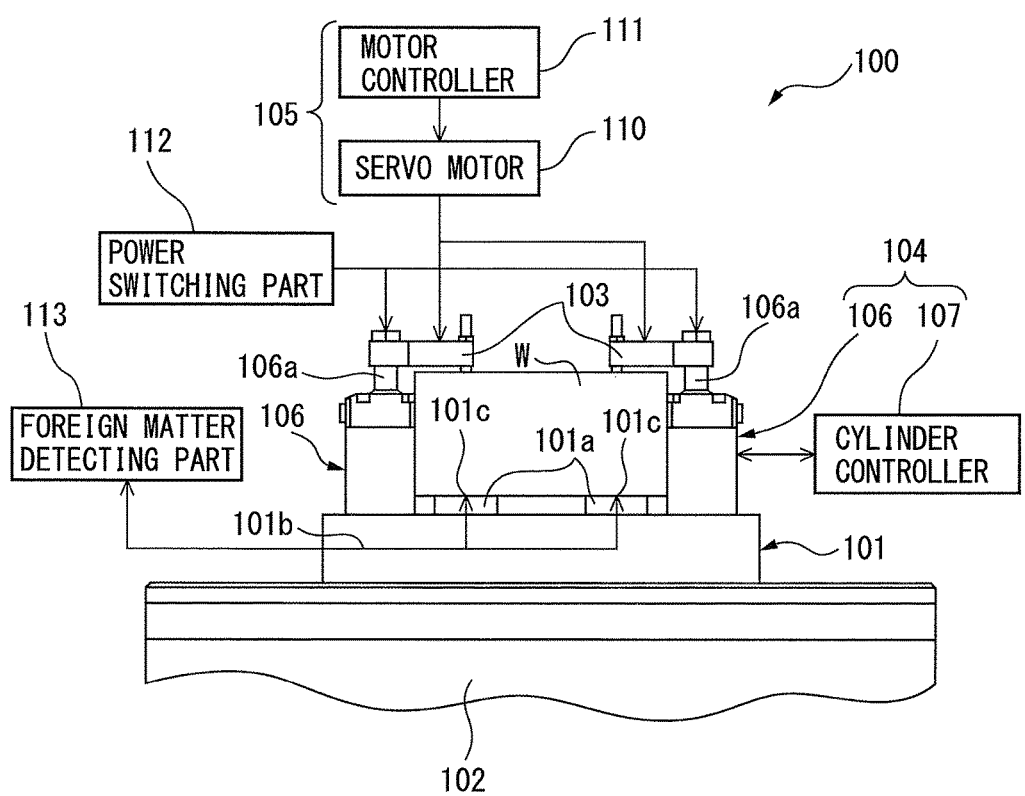
FIG. 1 is a block diagram which schematically shows an object fastening device according to an embodiment of the present invention.

Below, embodiments of the present invention will be explained in detail based on the drawings. First, referring to FIG. 1, an object fastening device 100 according to an embodiment of the present invention will be explained. The object fastening device 100 is for fastening a workpiece W on a jig 101. The jig 101 functions as a receiving part for supporting a workpiece W from below.

The object fastening device 100 includes a table part 102 which supports the jig 101 from below; a pushing part 103 for pushing a workpiece W against the jig 101, a first drive part 104 for generating a first force at the pushing part 103, and a second drive part 105 for generating a second force at the pushing part 103.

The jig 101 includes seat parts 101a which extending upward from the top surface of the jig 101. The workpiece W is placed on the seat parts 101a with surface-contacting the top surfaces of the seat parts 101a. A fluid feed path 101b, which would be explained below, is arranged inside of the jig 101. The fluid feed path 101b has openings 101c at the top surfaces of the seat parts 101a.

The first drive part 104 includes a cylinder 106 and a cylinder controller 107 which controls the cylinder 106. The cylinder 106 is, for example, a hydraulic cylinder and includes a cylinder shaft 106a. The cylinder controller 107 controls the pressure inside of the cylinder 106 and drives the cylinder shaft 106a in the axial direction by controlling the flow of the pressurized fluid fed from a external fluid feed source (not shown) to the inside of the cylinder 106.

The second drive part 105 includes a servo motor 110 and a motor controller 111 which controls the servo motor 110. The motor controller 111 sends a command to the servo motor 110 to control its rotary torque. The servo motor 110 operates in accordance with the command from the motor controller 111, and applies force to the pushing part 103 as explained later.

The pushing part 103 is mechanically connected to cylinder shafts 106a of cylinders 106 via a power switching part 112. The power switching part 112 can mechanically connect the pushing part 103 and the cylinder shafts 106a or disconnect the pushing part 103 and cylinder shafts 106a.

When the power switching part 112 connects the pushing part 103 and the cylinder shafts 106a each other, the pushing part 103 is driven by the cylinders 106 through the cylinder shafts 106a. The pushing part 103 receives force from the cylinders 106, and pushes the workpiece W against the jig 101 by the first force so as to fasten the workpiece W.

On the other hand, the pushing part 103 is also mechanically connected to an output shaft (not shown) of the servo motor 110. When the power switching part 112 disconnects the pushing part 103 and the cylinder shafts 106a, the pushing part 103 is driven by the servo motor 110. The pushing part 103 receives force from the servo motor 110 and pushes the workpiece W against the jig 101 by the second force.

Here, the first force generated at the pushing part 103 by the cylinders 106 is far larger than the second force generated at the pushing part 103 by the servo motor 110. For example, the first force by the cylinders 106 is set to 2 to 15 kN, while the second force by the servo motor 110 is set to 0.02 to 0.06 kN.

The object fastening device 100 further includes a foreign matter detecting part 113. The foreign matter detecting part 113 detects a foreign matter, such as a chip or dust, which is interposed between the workpiece W and the jig 101. Specifically, the foreign matter detecting part 113 feeds pressurized fluid from a external fluid feed source (not shown) to the fluid feed path 101b arranged in the jig 101. The foreign matter detecting part 113 detects fluctuations in pressure of the pressurized fluid which occur when the pressurized fluid leaks out from the openings 101c of the fluid feed path 101b through the spaces between the workpiece W and the seat parts 101a. The foreign matter detecting part 113 determines that foreign matter is interposed between the workpiece W and the seat parts 101a when the pressure of the pressurized fluid falls beyond a predetermined threshold value.

Next, the operation of the object fastening device 100 will be explained. When fastening a workpiece W on the jig 101 by means of the object fastening device 100, firstly, the workpiece W is placed on the seat parts 101a of the jig 101. Next, the motor controller 111 sends a command to the servo motor 110 and applies force to the pushing part 103. At this time, the power switching part 112 mechanically disconnect the pushing part 103 and the cylinder shafts 106a of the cylinders 106. The pushing part 103 receives force from the servo motor 110 and pushes the workpiece W against the jig 101 by the second force.

While the pushing part 103 pushes the workpiece W against the jig 101 by the second force, the foreign matter detecting part 113 detects fluctuations of pressure of the pressurized fluid fed to the fluid feed path 101b, and detects whether foreign matter is interposed between the workpiece W and the seat parts 101a. If the foreign matter detecting part 113 detects foreign matter, the motor controller 111 sends a command to the servo motor 110 so as to release the force against the pushing part 103. Then, the workpiece W is removed from the jig 101, and then the foreign matter interposed between the workpiece W and the seat parts 101a is removed.

On the other hand, when the foreign matter detecting part 113 does not detect foreign matter, or when the foreign matter between the workpiece W and the seat parts 101a is removed as stated above, the power switching part 112 mechanically connects the pushing part 103 and the cylinder shafts 106a each other. Then, the cylinder controller 107 controls the cylinders 106 so as to apply force to the pushing part 103 through the cylinder shafts 106a. The pushing part 103 receives force from the cylinder shafts 106a and pushes the workpiece W against the jig 101 by the first force. As a result, the workpiece W is strongly clamped and fastened between the pushing part 103 and the jig 101.

In this way, in the present embodiment, the object fastening device 100 is provided with two different drive parts, each of which includes a power source different from the other (i.e., cylinder, motor), one of which is constituted by the first drive part 104 for generating the first force for fastening the workpiece W at the pushing part 103, and the other of which is constituted by the second drive part 105 for generating the second force smaller than the first force at the pushing part 103.

Due to this configuration, it is possible to finely adjust the second force generated by the servo motor, thereby it is possible to detect whether foreign matter is interposed between the workpiece W and the seat parts 101a while pushing the workpiece W against the jig 101 by the second force controlled to appropriate magnitude. Therefore, the user can confirm whether the workpiece W is appropriately seated on the jig 101, while reliably preventing foreign matter from damaging the workpiece W.

Next, referring to FIG. 2, a machine tool 10 according to an embodiment of the present invention will be explained. Note that, an element similar to that of the above-mentioned embodiment will be assigned the same reference numeral, and detailed explanation thereof will be omitted. The machine tool 10 includes a tool spindle 11 and an object fastening device 200. At the front end of the tool spindle 11, a cutting tool for cutting the workpiece W or a later mentioned pushing tool 201 is attached depending on the operation to be performed. The spindle controller 12 controls the operation of the tool spindle 11. Specifically, the spindle controller 12 sends a command to a servo motor (not shown) built into the tool spindle 11 so as to move the tool spindle 11 in the axial direction of the tool spindle 11 as shown by the arrow $D_1$ in FIG. 2.

The object fastening device 200 includes a table part 102; a first pushing part 203 which pushes the workpiece W against the jig 101 to fasten it; and a first drive part which generating the first force at the first pushing part 203. The first pushing part 203 is fastened to cylinder shafts 106a of the cylinder 106. Similar to the above embodiment, the cylinder 106 generating the first force at the first pushing part 203 through the cylinder shafts 106a in accordance with the command from a cylinder controller 107.

In the present embodiment, the object fastening device 200 includes the pushing tool 201 which is attached to the tool spindle 11. Next, referring to FIGS. 3A and 3B, the configuration of the pushing tool 201 will be explained. The pushing tool 201 includes a shank 210; a second pushing part 211; and a coupling member 212 for coupling the second pushing part 211 to the shank 210.

The shank 210 includes a tapered shank part 210a; a flange part 210b extending radially outward from the bottom end of the tapered shank part 210a; and a main shank part 210c extending axially downward from the bottom end of the flange part 210b. At the bottom end face 210d of the main shank part 210c, a recessed part 210e is formed so as to be recessed upward from the bottom end surface 210d.

The coupling member 212 is fixed inside of the recessed part 210e. The coupling member 212 includes a cylindrical main part 212a extending in the axial direction; and a claw 212b extending radially inward from the bottom end of the main part 212a. The second pushing part 211 includes a columnar shaped main part 211a extending in the axial direction; a claw 211b extending radially outward from the upper end of the main part 211a; and a flange plate 211c fixed to the bottom end of the main part 211a so as to extend radially outward from the bottom end of the main part 211a.

The second pushing part 211 is slidably arranged inside of the coupling member 212. As shown in FIG. 3B, when the second pushing part 211 is arranged inside of the coupling member 212, the claw 211b of the second pushing part 211 engages the claw 212b of the coupling member 212, thereby the second pushing part 211 is prevented from detaching from the coupling member 212 downward in the axial direction.

A spring 213 is inserted between the second pushing part 211 and the bottom surface 210f of the recessed part 210e. The spring 213 is displaced as the second pushing part 211 moves axially upward relative to the coupling member 212, and gives an elastic force to the second pushing part 211 in response to the displacement.

Next, referring to FIGS. 2 to 3B, the operation of the machine tool 10 will be explained. When machining the workpiece W by means of the machine tool 10, the object fastening device 200 is used to fasten the workpiece W on the jig 101. In this case, firstly, the workpiece W is placed on the seat parts 101a of the jig 101.

Next, the spindle controller 12 operates the tool spindle 11 and moves the pushing tool 201 axially downward so as to position it at a predetermined position. When the pushing tool 201 is positioned at the predetermined position, the flange part 211c of the second pushing part 211 contacts the top surface of the workpiece W, and the second pushing part 211 is pushed by the workpiece W so as to move axially upward relative to the coupling member 212. With this relative movement of the second pushing part 211, the spring 213 is displaced and gives elastic force to the second pushing part 211. The second pushing part 211 receives elastic force from the spring 213, and pushes the workpiece W against the jig 101 by the second force.

Thus, in the present embodiment, the second force is generated at the second pushing part 211 due to the actions of the tool spindle 11 controlled by the spindle controller 12 and the spring 213 provided at the pushing tool 201. Therefore, the tool spindle 11 with a servo motor, spindle controller 12, and spring 213 function as the second drive part which generates the second force at the second pushing part 211. The second force generated in this way is determined by the amount of displacement of the spring 213, i.e., the position of the pushing tool 201 with respect to the workpiece W.

Therefore, the spindle controller 12 can set the second force to a desired magnitude by controlling the operation of the tool spindle 11 with a high precision. In addition, the tool spindle 11 moves in the axial direction so as to approach or move away from the workpiece W (or jig 101) by the servo motor built into the tool spindle 11 under the control of the spindle controller 12. Therefore, in the present embodiment, the tool spindle 11 functions as a movement mechanism movable in a direction approaching or moving away from the workpiece W (or jig 101).

The foreign matter detecting part 113 detects fluctuations in pressure of the pressurized fluid fed to the fluid feed path 101b and detects whether foreign matter is interposed between the workpiece W and the seat parts 101a, while the second pushing part 211 pushes the workpiece W against the jig 101 by the second force under the action of the spring 213.

When the foreign matter detecting part 113 detects foreign matter, the spindle controller 12 operate the tool spindle 11 so as to move the pushing tool 201 upward in the axial direction, thereby releases the second force applied to the workpiece W. Then, the workpiece W is removed from the jig 101, and the foreign matter interposed between the workpiece W and the seat parts 101a is removed.

On the other hand, when the foreign matter detecting part 113 does not detect foreign matter, or when the foreign matter between the workpiece W and the seat parts 101a is removed as stated above, the cylinder controller 107 controls the cylinders 106 so as to apply force to the first pushing part 203 through the cylinder shafts 106a. The first pushing part 203 receives force from the cylinder shafts 106a and pushes the workpiece W against the jig 101 by the first force. As a result, the workpiece W is strongly clamped between the first pushing part 203 and the jig 101 so as to be fastened.

According to the present embodiment, the object fastening device 200 is provided with two different drive parts, each of which includes a drive sources (cylinders, springs, servo motors) different from the other, one of which is constituted by the first drive part 104 for generating the first force, the other of which is constituted by the second drive part for generating the second force smaller than the first force. In addition, the object fastening device 200 is provided with two different pushing parts, one of which is the first pushing part 203 driven by the first drive part 104, and the other of which is the second pushing part 211 driven by the second drive part.

Due to this configuration, by controlling the movement of the tool spindle 11, it is possible to adjust the magnitude of the second force in an easy and highly precise manner, and possible to detect whether foreign matter is interposed between the workpiece W and seat parts 101a while pushing the workpiece W against the jig 101 by a appropriately controlled second force. Therefore, the user can confirm whether the workpiece W is appropriately seated on the jig 101, while reliably preventing foreign matter from damaging the workpiece W.

Further, according to the present embodiment, a spring 213 is used as the mechanism for generating the second force at the second pushing part 211. Due to this, it is possible to simplify the apparatus for generating the second force, thereby reducing the manufacturing cost.

In the pushing tool 201 shown in FIGS. 3A and 3B, a servo motor may be applied instead of a spring 213 and the servo motor may be used to generate the second force. Below, referring to FIGS. 4A and 4B, the pushing tool 251 according to another embodiment applying such a servo motor will be explained. Note that elements similar to the above embodiment will be assigned the same reference numerals and detailed explanations will be omitted.

The pushing tool 251 includes a shank 210 similar to the above embodiment; a servo motor 252 held in a recessed part 210e formed in the main shank part 210c; a motion converting part 253 connected to the output shaft (not shown) of the servo motor 252; and a second pushing part 254 fixed to the motion converting part 253.

The servo motor 252 rotates the output shaft in accordance with a command from a motor controller 255. The motion converting part 253 is comprised of e.g. a ball-screw mechanism and converts rotary motion of the output shaft to motion in the axial direction. The second pushing part 254 is driven in the axial direction through a motion converting part 253 driven by the servo motor 252.

Next, the mechanism for generating the second force at the second pushing part 254 in the case of applying the pushing tool 251 according to the present embodiment to the machine tool 10 shown in FIG. 2 will be explained. When pushing the workpiece W against the jig 101 by the second force by means of the second pushing part 254, the spindle controller 12 operates the tool spindle 11 and arranges the pushing tool 251 at a predetermined position. When the pushing tool 251 is arranged at the predetermined position, the second pushing part 254 lightly contacts the top surface of the workpiece W.

In this state, the motor controller 255 sends a command to the servo motor 252 so as to move the second pushing part 254 downward in the axial direction. The motor controller 255 drives the servo motor 252 until the output torque of the servo motor 252 exceeds a predetermined torque limiter. This torque limiter is suitably set in accordance with the magnitude of the second force to be generated at the second pushing part 254. Due to this, the second pushing part 254 can push the workpiece W against the jig 101 by a second force of a suitably adjusted strength.

Thus, in the present embodiment, the second force is generated at the second pushing part 254 by the operation of the tool spindle 11 which appropriately positions the servo motor 252 relative to the workpiece W, and by the operation of the servo motor 252. Therefore, the tool spindle 11 having a servo motor, the spindle controller 12, and the servo motor 252 function as the second drive part for generating the second force at the pushing part 254.

In addition, the tool spindle 11 moves in the axial direction so as to approach or move away from the workpiece W (or the jig 101) by the servo motor built into the tool spindle 11 under the control of the spindle controller 12. Therefore, in the present embodiment, the tool spindle 11 functions as the movement mechanism movable in a direction approaching or moving away from the workpiece W (or jig 101).

According to the present embodiment, the servo motor 252 is used as a mechanism for generating the second force at the second pushing part 254. Therefore, it is possible to simply and precisely adjust the magnitude of the second force by controlling the output torque of the servo motor 252. Further, it is also possible to reduce the manufacturing cost since the device for generating the second force can be simplified.

Next, referring to FIG. 5, a robot 50 according to an embodiment of the present invention will be explained. Note that elements similar to the above embodiments will be assigned the same reference numerals and detailed explanations thereof will be omitted. The robot 50 includes a robot arm 51; a robot arm controller 52 controlling the operation of the robot arm 51; a robot hand 54 provided at the front end of the robot arm 51; and an object fastening device 300.

The robot arm 51 is connected to a turning base (not shown) which can turn about a vertical axis, and includes a lower arm (not shown) attached to the turning base; and a forearm 51a attached to the lower arm. A wrist 53 is attached to the front end of the forearm 51a. The robot hand 54 is connected to the robot arm 51 via the wrist 53. The robot arm controller 52 operates the robot arm 51 by driving servo motors provided at the articulated axes of the robot arm 51. Further, the robot hand 54 can grip and release an object in accordance with a command from the robot arm controller 52.

Figure 2:
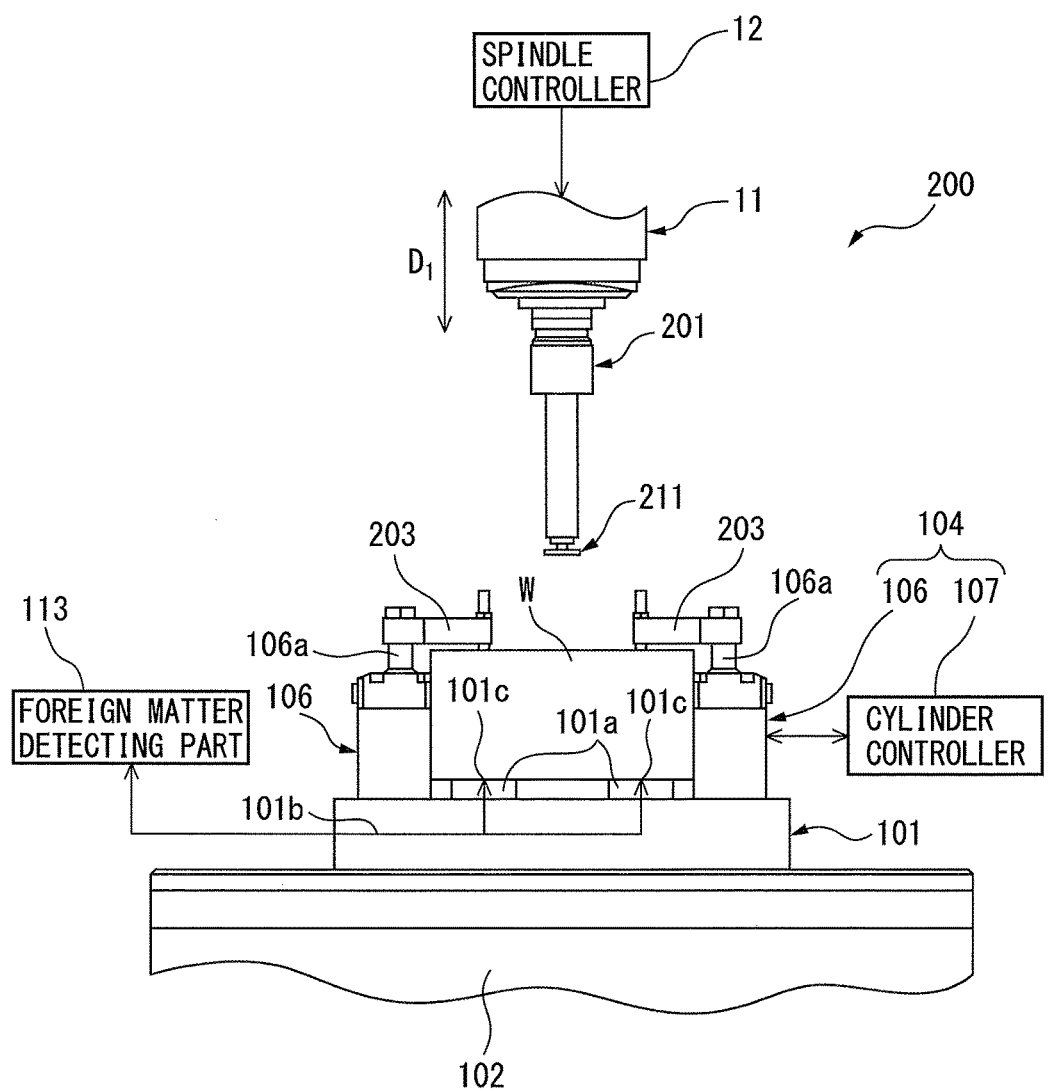
FIG. 2 is a block diagram which schematically shows a machine tool according to an embodiment of the present invention.

The object fastening device 300 includes the table part 102, first pushing part 203, first drive part 104, foreign matter detecting part 113, and pushing tool 201 similar to the embodiment shown in FIG. 2. In the present embodiment, the pushing tool 201 is releasably held by the robot hand 54.

Next, referring to FIG. 5, the operation of the robot 50 according to the present embodiment will be explained. When machining the workpiece W by means of the robot 50, the workpiece W is fastened on the jig 101 by the object fastening device 300. In this case, firstly, the workpiece W is placed on the seat parts 101a of the jig 101.

Next, the robot arm controller 52 operates the robot arm 51 and moves the pushing tool 201 toward the workpiece W so as to position it at a predetermined position. When the pushing tool 201 is positioned at the predetermined position, the second pushing part 211 of the pushing tool 201 contacts the top surface of the workpiece W and is pushed by the workpiece W so as to be moved axially upward relative to the coupling member 212 of the pushing tool 201. Along with this, the spring 213 provided at the pushing tool 201 is displaced, thereby the second pushing part 211 pushes the workpiece W against the jig 101 by the second force by the action of the spring 213.

In this way, in the present embodiment, the second force is generated at the second pushing part 211 by the operation of the robot arm 51 controlled by the robot arm controller 52, and by the action of the spring 213 provided at the pushing tool 201. Therefore, the robot arm 51 having a servo motor therein, the robot arm controller 52, and the spring 213 function as the second drive part for generating the second force at the second pushing part 211.

The robot arm controller 52 can precisely control the operation of the robot arm 51 so as to set the second force at a desired magnitude. In addition, the robot arm 51 moves in the axial direction to approach or move away from the workpiece W (or jig 101). Therefore, in the present embodiment, the robot arm 51 functions as a movement mechanism movable in a direction approaching and moving away from the workpiece W (or jig 101).

The foreign matter detecting part 113 detects fluctuations in pressure of the pressurized fluid fed to the fluid feed path 101b and detects whether foreign matter is interposed between the workpiece W and the seat parts 101a, while the second pushing part 211 pushes the workpiece W against the jig 101 by the second force due to the action of the spring 213.

When the foreign matter detecting part 113 detects foreign matter, the robot arm controller 52 operates the robot arm 51 so as to move the pushing tool 201 upward in the axial direction, and releases the second force applied to the workpiece W. Then, the workpiece W is removed from the jig 101 and the foreign matter interposed between the workpiece W and the seat parts 101a is removed.

On the other hand, when the foreign matter detecting part 113 does not detect foreign matter, or when foreign matter between the workpiece W and the seat parts 101a is removed as stated above, the cylinder controller 107 controls the cylinders 106 so as to apply force to the first pushing part 203 through the cylinder shafts 106a. The first pushing part 203 receives force from the cylinder shafts 106a and pushes the workpiece W against the jig 101 by the first force. Due to this, the workpiece W is strongly clamped between the first pushing part 203 and the jig 101 so as to be fastened.

According to the present embodiment, it is possible to precisely control the position of the pushing tool 201 with respect to the workpiece W (i.e., the amount of displacement of the spring 213) by controlling movement of the robot arm 51. Therefore, it is possible to adjust the magnitude of the second force simply and with a high precision.

Next, referring to FIG. 6, a method of fastening a workpiece W to a jig 101 according to an embodiment of the present invention will be explained. At step S1, a workpiece W is placed on the jig 101. At step S2, the workpiece W is pushed against the jig 101 by a second force. For example, in the embodiment shown in FIG. 1, at this step S2, the motor controller 111 sends a command to the servo motor 110 so as to move the pushing part 103 downward in the axial direction to push the workpiece W against the jig 101 by the second force.

Further, in the embodiment shown in FIG. 2, at this step S2, the spindle controller 12 operates the tool spindle 11 so as to position the pushing tool 201 at a predetermined position. Along with this, the spring 213 is displaced, thereby the second pushing part 211 receives the elastic force from the spring 213 and pushes the workpiece W against the jig 101 by the second force.

Figure 4A:
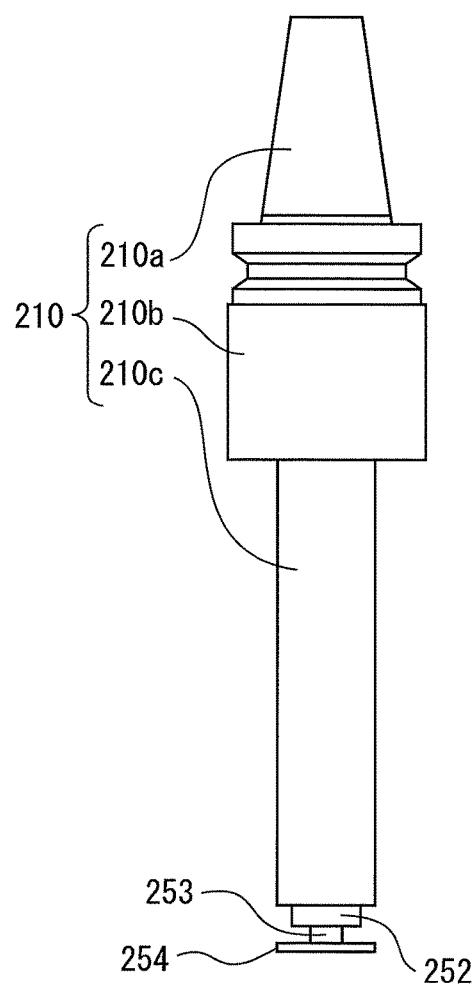
FIG. 4A is a side view of a pushing tool according to another embodiment of the present invention.
Figure 4B:
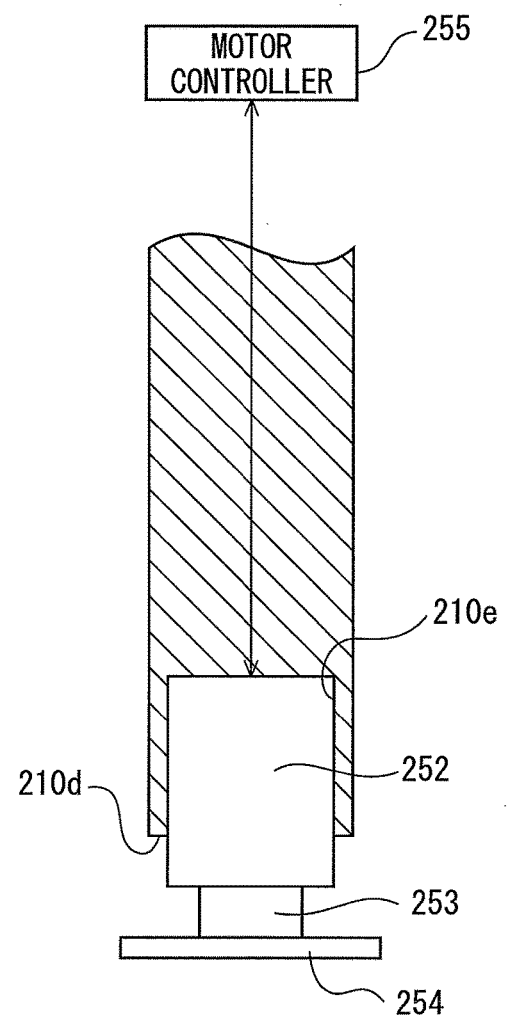
FIG. 4B is a side cross-sectional view of the pushing tool shown in FIG. 4A.

Further, in the embodiment shown in FIGS. 4A and 4B, at this step S2, the spindle controller 12 operates the tool spindle 11 so as to position the pushing tool 201 at a predetermined position. Then, the motor controller 255 sends a command to the servo motor 252 so as to move the second pushing part 254 downward in the axial direction to push the workpiece W against the jig 101 by a second force.

Further, in the embodiment shown in FIG. 5, at this step S2, the robot arm controller 52 operates the robot arm 51 so as to position the pushing tool 201 at a predetermined position. Along with this, the spring 213 is displaced, thereby the second pushing part 211 pushes the workpiece W against the jig 101 by the second force due to the action of this spring 213.

At step S3, the foreign matter detecting part 113 detects foreign matter interposed between the workpiece W and the jig 101. Specifically, the foreign matter detecting part 113 feeds pressurized fluid from a fluid feed source to the fluid feed path 101b arranged inside the jig 101. Then, the foreign matter detecting part 113 acquires data relating to the fluctuations of pressure of the pressurized fluid.

At step S4, it is judged whether foreign matter is interposed between the workpiece W and the jig 101. Specifically, the foreign matter detecting part 113 refers to the data acquired at step S3, and judges whether the pressure of the pressurized fluid has fallen below a predetermined threshold value. The foreign matter detecting part 113 judges "YES" when the pressure of the pressurized fluid becomes lower than the predetermined threshold value, then the routine proceeds to step S8. On the other hand, the foreign matter detecting part 113 judges "NO" when the pressure of the pressurized fluid remains higher than the predetermined threshold value, then the routine proceeds to step S5.

At step S5, the second force applied to the workpiece W is released. For example, in the embodiment shown in FIG. 1, at this step S5, the motor controller 111 sends a command to the servo motor 110 so as to drive the pushing part 103 upward in the axial direction to release the second force. Further, in the embodiment shown in FIG. 2, at this step S5, the spindle controller 12 operates the tool spindle 11 so as to move the second pushing part 211 upward in the axial direction. As a result, the second force applied to the workpiece W by the second pushing part 211 is released.

Further, in the embodiment shown in FIGS. 4A and 4B, at this step S5, the motor controller 255 sends a command to the servo motor 252 so as to move the second pushing part 254 upward in the axial direction to release the second force. Further, in the embodiment shown in FIG. 5, at this step S5, the robot arm controller 52 operates the robot arm 51 so as to move the pushing tool 201 upward in the axial direction to release the second force.

At step S6, the workpiece W is pushed against the jig 101 by the first force. Specifically, the cylinder controller 107 controls the cylinder 106 so as to apply force to the pushing part 103 through the cylinder shaft 106a. The pushing part 103 receives force from the cylinder 106 and pushes the workpiece W against the jig 101 by the first force so as to fasten it.

At step S7, the workpiece W is machined. For example, in the embodiment shown in FIG. 2, at this step S7, the user replaces the pushing tool 201 with the cutting tool (not shown). Then, the spindle controller 12 operates the tool spindle 11 so as to position the cutting tool with respect to the workpiece W, and cuts the workpiece W by the cutting tool. When step S7 is completed, the flow shown in FIG. 6 is ended.

On the other hand, when it is judged "YES" at step S4, at step S8, the second force applied to the workpiece W is released in the same way as step S5. Then, at step S9, foreign matter interposed between the workpiece W and the jig 101 is removed. For example, foreign matter interposed between the workpiece W and the jig 101 may be removed by blowing pressurized gas onto the surface of the workpiece W removed from the jig 101. After step S9 is completed, the routine returns to step S2.

Figure 6:
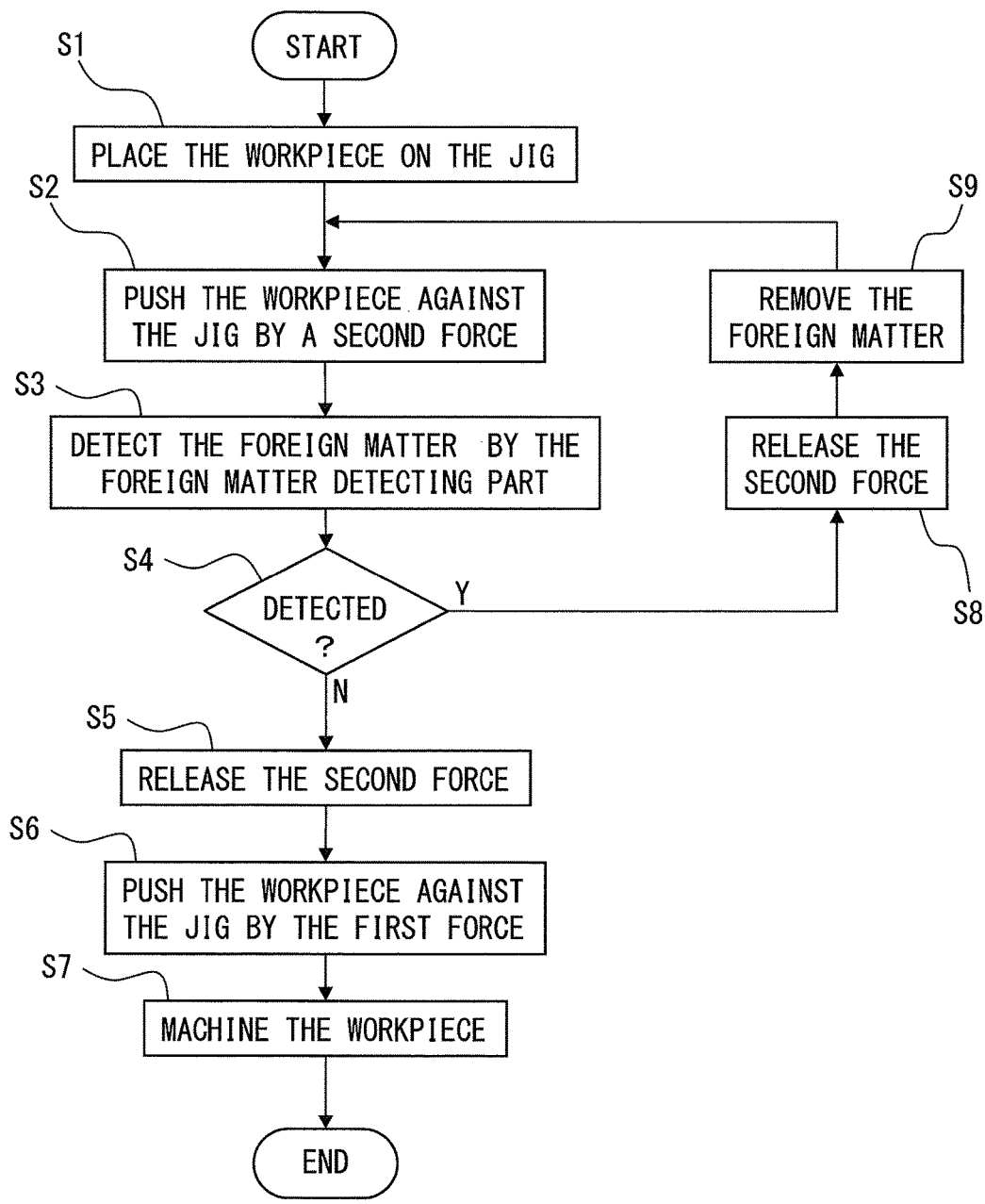
FIG. 6 is a flow chart of a method of fastening a workpiece to a jig, according to an embodiment of the present invention.

Note that, in the flow shown in FIG. 6, the workpiece W is pushed against the jig 101 by the first force at step S6 after the second force is released at step S5. However, the invention is not limited to this. It is also possible to apply the first force to the workpiece W in an overlapping manner while giving the second force to the workpiece W and later remove the second force. Further, in the flow shown in FIG. 6, the routine returns to step S2 after step S9. However, the invention is not limited to this. The routine may also proceed to step S6 after step S9.

Further, in the embodiments which were shown in FIG. 2 to FIG. 5, the case of generating the second force by the spring 213 or servo motor 252 was explained. However, the invention is not limited to this. The second force may also be generated by the operation of the tool spindle 11 or the robot arm 51 without using the spring 213 or servo motor 252. In this case, the servo motor which is built into the tool spindle 11 or the robot arm 51 functions as part of the drive part for generating the second force.

As explained above, according to the present invention, it becomes possible to finely adjust the second force. Also, second force which is controlled to a suitable strength is used to detect if foreign matter is interposed between the workpiece and receiving part while pushing the workpiece against the jig. Due to this, it is possible to reliably prevent foreign matter from causing the workpiece to end up being damaged while performing the work of confirming if the workpiece suitably is seated on the receiving part.

Above, the present invention was explained through embodiments of the present invention, but the above embodiments do not limit the invention relating to the claims. Further, all combinations of features which were explained in the embodiment are not necessarily essential for the invention. Further, the above embodiments can be changed or improved in various ways as clear to a person skilled in the art. Such changed or improved embodiments are also included in the technical scope of the present invention as clear from the claim language.

Further, it should be noted that the operations, routines, steps, stages, and other processing in the apparatus, system, program, and method in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next", etc. for convenience, this does not mean the execution in this order is essential.

The invention claimed is:

1. A machine tool comprising:
a tool spindle;
a receiving part positioned to physically contact an object;
a first pushing part positioned to physically contact the object;
a first drive part connected to the first pushing part, the first drive part, in response to a control signal from a controller, applying a first force to the first pushing part moving the first pushing part to push the object against the receiving part;
a second pushing part attached to the tool spindle and positioned to physically contact the object;
a second drive part independently controllable from the first drive part and, in response to a control signal from the controller, applying a second force to the second pushing part moving the second pushing part to push the object against the receiving part,
wherein the second drive part includes a spring and a servo motor generating the second force, and a movement mechanism movable in a direction approaching and moving away from the receiving part by the servo motor, the second pushing part is connected to the movement mechanism; and
a foreign matter detecting part detecting a foreign matter interposed between the object and the receiving part while the second pushing part pushes the object against the receiving part by the second force generated by the second drive part;
wherein the controller is configured to:
control the second drive part to drive the tool spindle so as to move the second pushing part to push the object against the receiving part by the second force to detect foreign matter;
control the second drive part to drive the tool spindle so as to move the second pushing part away from the object when no foreign matter is detected; and
control the first drive part to move the first pushing part to push the object against the receiving part when no foreign matter is detected.

2. A robot comprising
a robot arm;
a receiving part positioned to physically contact an object;
a first pushing part positioned to physically contact the object;
a first drive part connected to the first pushing part, the first drive part, in response to a control signal from a controller, applying a first force to the first pushing part moving the first pushing part to push the object against the receiving part;
a second pushing part attached to the robot arm and positioned to physically contact the object;
a second drive part independently controllable from the first drive part and in response to a control signal from the controller, applying a second force to the second pushing part moving the second pushing part to push the object against the receiving part,
wherein the second drive part includes a spring and a servo motor generating the second force, and a movement mechanism movable in a direction approaching and moving away from the receiving part by the servo motor, the second pushing part is connected to the movement mechanism; and
a foreign matter detecting part detecting a foreign matter interposed between the object and the receiving part while the second pushing part pushes the object against the receiving part by the second force generated by the second drive part, wherein the controller is configured to:
control the second drive part to drive the robot arm so as to move the second pushing part to push the object against the receiving part by the second force to detect foreign matter;
control the second drive part to drive the robot arm so as to move the second pushing part away from the object when no foreign matter is detected; and
control the first drive part to move the first pushing part to push the object against the receiving part when no foreign matter is detected.

3. The robot according to claim 2, further comprising a robot hand attached to the robot arm and releasably gripping the second pushing part.